United States Patent
Arai et al.

(10) Patent No.: US 12,504,482 B2
(45) Date of Patent: Dec. 23, 2025

(54) DETERIORATION STATE ESTIMATION DEVICE, DETERIORATION STATE ESTIMATION METHOD, PROGRAM, AND POWER SUPPLY DEVICE FOR ANODE-FREE LITHIUM BATTERY EQUIPPED WITH SAME

(71) Applicant: TeraWatt Technology K.K., Yokohama (JP)

(72) Inventors: Juichi Arai, Yokohama (JP); Ken Ogata, Yokohama (JP)

(73) Assignee: TeraWatt Technology K.K., Yokohama (JP)

( * ) Notice: Subject to any disclaimer, the term of this patent is extended or adjusted under 35 U.S.C. 154(b) by 329 days.

(21) Appl. No.: 18/167,709

(22) Filed: Feb. 10, 2023

(65) Prior Publication Data
US 2023/0273267 A1     Aug. 31, 2023

Related U.S. Application Data

(63) Continuation of application No. PCT/JP2020/030800, filed on Aug. 13, 2020.

(51) Int. Cl.
*G01R 31/392* (2019.01)
*G01R 31/367* (2019.01)
(Continued)

(52) U.S. Cl.
CPC ......... *G01R 31/392* (2019.01); *G01R 31/367* (2019.01); *H01M 10/0525* (2013.01);
(Continued)

(58) Field of Classification Search
CPC ............... G01R 31/367; G01R 31/392; H01M 10/0525; H01M 10/48; H01M 10/425; H01M 2010/4271; Y02E 60/10
(Continued)

(56) References Cited

U.S. PATENT DOCUMENTS

2017/0038436 A1    2/2017 Montaru
2019/0091470 A1    3/2019 Lee et al.
(Continued)

FOREIGN PATENT DOCUMENTS

CN    106199443 A    12/2016
CN    107942261 A     4/2018
(Continued)

OTHER PUBLICATIONS

Imai et al. WO 2019189821 A1 English text, Date Published Oct. 3, 2019 (Year: 2019).*
(Continued)

*Primary Examiner* — John H Le
(74) *Attorney, Agent, or Firm* — Kilpatrick Townsend & Stockton LLP

(57) ABSTRACT

It is an object of the present invention to accurately estimate the state of deterioration and service life of a secondary battery having a negative electrode free of a negative electrode active material using a simple configuration. One aspect of the present invention is a state-of-deterioration estimating device in a secondary battery having a negative electrode free of a negative electrode active material, the state-of-deterioration estimating device comprising: an acquiring unit that acquires a post-discharge OCV that is an open circuit voltage (OCV) in the state after a predetermined amount of time or more has elapsed since the discharge was stopped; a calculating unit that calculates the state of deterioration of the secondary battery based on the acquired post-discharge OCV by referencing characteristic information indicating the change in a predetermined deterioration index that indicates the degree of deterioration in the secondary battery relative to the change in the post-discharge OCV of the secondary battery; and an output unit that outputs the state of deterioration that has been calculated.

4 Claims, 11 Drawing Sheets

(51) Int. Cl.
    *H01M 10/0525* (2010.01)
    *H01M 10/42* (2006.01)
    *H01M 10/48* (2006.01)

(52) U.S. Cl.
    CPC ......... *H01M 10/425* (2013.01); *H01M 10/48* (2013.01); *H01M 2010/4271* (2013.01)

(58) Field of Classification Search
    USPC .......................................................... 702/63
    See application file for complete search history.

(56) References Cited

U.S. PATENT DOCUMENTS

| | | | |
|---|---|---|---|
| 2019/0361076 A1 | 11/2019 | Koyamada et al. | |
| 2020/0386851 A1* | 12/2020 | Eakins | G01S 11/10 |
| 2021/0013543 A1* | 1/2021 | Imai | H01M 4/0407 |
| 2021/0048482 A1 | 2/2021 | Ukumori | |
| 2021/0367277 A1 | 11/2021 | Takechi | |
| 2023/0100360 A1* | 3/2023 | Imoto | H01M 10/058 |
| | | | 429/144 |
| 2023/0194621 A1 | 6/2023 | Arai et al. | |

FOREIGN PATENT DOCUMENTS

| | | |
|---|---|---|
| CN | 111157908 A | 5/2020 |
| JP | H06-089745 A | 3/1994 |
| JP | 2000-261901 A | 9/2000 |
| JP | 2006-269242 A | 10/2006 |
| JP | 2006-329707 A | 12/2006 |
| JP | 2007-195312 A | 8/2007 |
| JP | 2012-057956 A | 3/2012 |
| JP | 2012-221788 A | 11/2012 |
| JP | 2017514127 A * | 6/2017 |
| JP | 2017195727 A * | 10/2017 |
| JP | 2019-025971 A | 2/2019 |
| JP | 2019-203777 A | 11/2019 |
| JP | 2020-054214 A | 4/2020 |
| WO | 2018/003210 A | 1/2018 |
| WO | 2019/058666 A | 3/2019 |
| WO | 2019/181727 A | 9/2019 |
| WO | 2019/189821 A | 10/2019 |
| WO | WO-2019189821 A1 * | 10/2019 ............... H01B 1/06 |
| WO | 2019/230069 A | 12/2019 |
| WO | 2019/240225 A | 12/2019 |
| WO | 2022/034671 A1 | 2/2022 |
| WO | 2022/034704 A | 2/2022 |

OTHER PUBLICATIONS

JMontaru Maxime, JP 2017-514127 English Translation, Date Published Jun. 1, 2017 (Year: 2017).*

Takahashi, JP 2017195727 English Translation , Date published: : Oct. 26, 2017 (Year: 2017).*

International Search Report for PCT/JP2021/007491 mailed May 18, 2021, all pages.

* cited by examiner

DETERIORATION STATE ESTIMATION DEVICE, DETERIORATION STATE ESTIMATION METHOD, PROGRAM, AND POWER SUPPLY DEVICE FOR ANODE-FREE LITHIUM BATTERY EQUIPPED WITH SAME

CROSS-REFERENCES TO RELATED APPLICATIONS

This application is a continuation of International Application No. PCT/JP2020/030800, filed Aug. 13, 2020, the entire contents of which are incorporated herein by reference.

BACKGROUND OF THE INVENTION

The present invention relates to a state-of-deterioration estimating device, a state-of-deterioration estimating method and program, and a power supply for anode-free lithium batteries equipped with these.

Secondary batteries are known to deteriorate after repeated charging and discharging during use. Therefore, various methods for estimating the state of deterioration of secondary batteries have been proposed.

For example, Patent Document 1 describes a secondary power supply that extrapolates the rate of change in the discharge capacity or discharge end voltage after each cycle in a battery group configured by connecting a plurality of secondary batteries in series in order to estimate the remaining cycle life from the number of cycles required to reach a set value. In addition, Patent Document 2 describes a service life measuring device in which a correlation function is determined that has a high correlation value with the accumulated full charge capacity or internal resistance of a secondary battery, the point at which the determined correlation function intersects a service life determining line is determined to be the service life of the secondary battery, and the distance traveled up to the service life is estimated to be the remaining service life.

CITATION LIST

Patent Literature

Patent Document 1: JP H06-089745 A
Patent Document 2: JP 2007-195312 A

BRIEF SUMMARY OF THE INVENTION

Technical Problem

However, estimating the state of deterioration using these methods requires a large number of calculations which complicates the calculation process and sometimes impedes the accuracy of estimates. Also, as mentioned above, it is not easy to estimate the state of deterioration of a conventional lithium ion battery. In addition, there is no known method for accurately estimating the state of deterioration and service life of a secondary battery that has a negative electrode free of an active material.

It is an object of the present invention to provide a state-of-deterioration estimating device, a state-of-deterioration estimating method, and a state-of-deterioration estimating program that can accurately estimate the state of deterioration and service life of a secondary battery having a negative electrode free of a negative electrode active material using a simple configuration.

Solution to Problem

As a result of extensive testing, the present applicant discovered that the open circuit voltage (post-discharge OCV) measured after a predetermined amount of time has passed after a discharge and a predetermined deterioration index indicating the extent of deterioration in a secondary battery having a negative electrode free of a negative electrode active material have a linear relationship. One aspect of the present invention is a state-of-deterioration estimating device in a secondary battery having a negative electrode free of a negative electrode active material, the state-of-deterioration estimating device comprising: an acquiring unit that acquires a post-discharge OCV that is an open circuit voltage (OCV) in the state after a predetermined amount of time or more has elapsed since the discharge was stopped; a calculating unit that calculates the state of deterioration of the secondary battery based on the acquired post-discharge OCV by referencing characteristic information indicating the change in a predetermined deterioration index that indicates the degree of deterioration in the secondary battery relative to the change in the post-discharge OCV of the secondary battery; and an output unit that outputs the state of deterioration that has been calculated.

In this aspect, the SOH of a secondary battery having a negative electrode free of a negative electrode active material is calculated based on the measured post-discharge OCV by referencing characteristic information prepared in advance that indicates the change in a predetermined deterioration index relative to the change in the post-discharge OCV. This reduces the calculations required to estimate the state of deterioration and improves the accuracy of estimates accordingly. As a result, the state of deterioration and service life of a secondary battery having a negative electrode free of a negative electrode active material can be estimated with great accuracy using a simple configuration.

Effect of Invention

The present invention is able to provide a state-of-deterioration estimating device, a state-of-deterioration estimating method, a state-of-deterioration estimating program, and a power supply for anode-free lithium batteries equipped with these that can accurately estimate the state of deterioration and service life of a secondary battery having a negative electrode free of a negative electrode active material using a simple configuration.

DETAILED DESCRIPTION OF THE INVENTION

A preferred embodiment of the present invention will now be described with reference to the appended drawings. Note that similar or identical configurations in each figure are denoted by the same reference numbers.

Configuration of Power Supply 1

Figure 1:
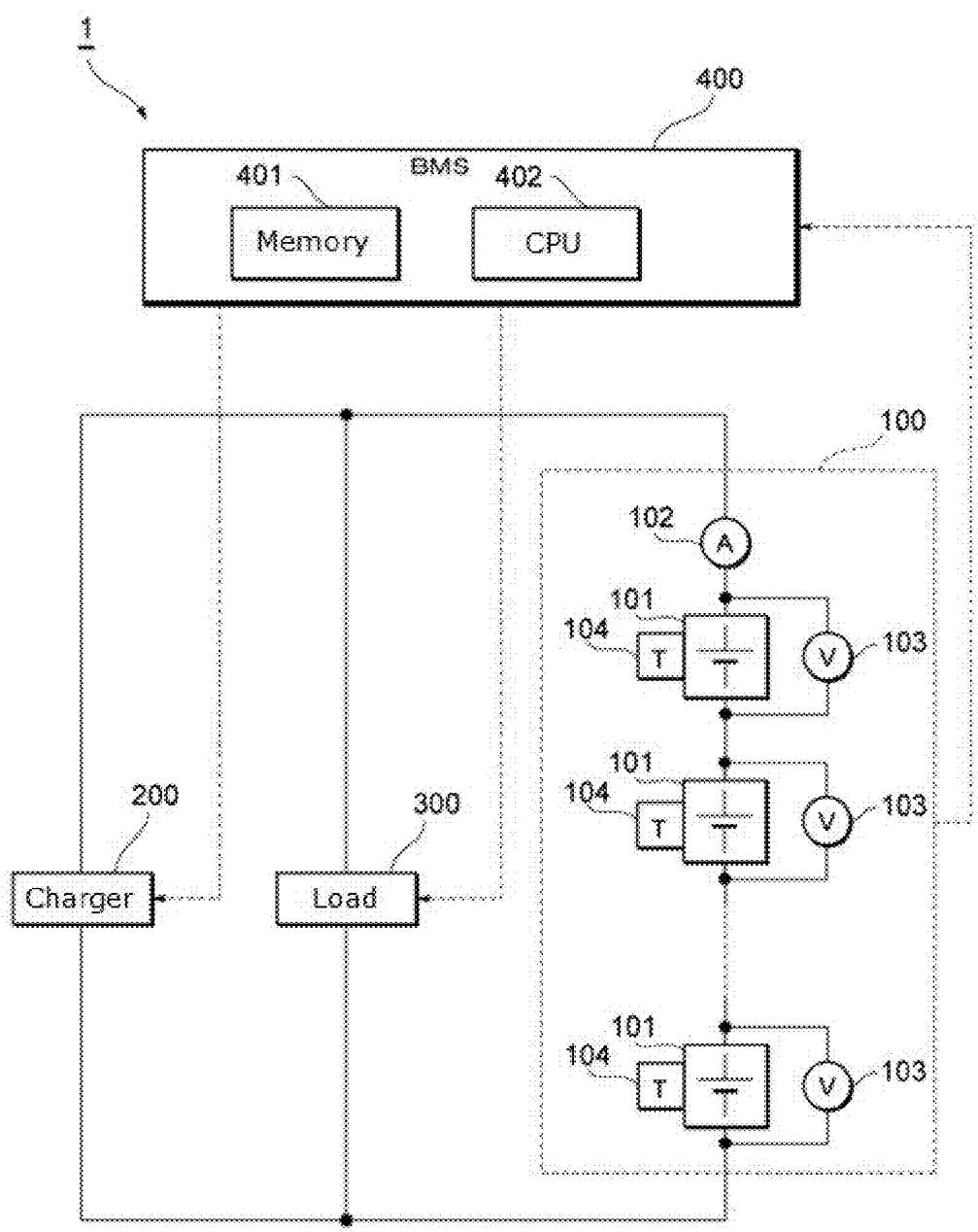
FIG. 1 is a block diagram showing an example of a schematic configuration for a power supply device 1 according to an embodiment of the present invention.

FIG. 1 is a block diagram showing an example of a schematic configuration for a power supply device 1 according to an embodiment of the present invention.

The battery device 1 includes, for example, a battery module 100, a charger 200, a load 300, and a battery management system (BMS) 400.

The battery module 100 includes a plurality of secondary battery cells 101 arranged and connected to each other in series. There are no particular restrictions on the number of secondary battery cells 101 included in the battery module 100. The plurality of secondary battery cells 101 may have the same characteristics or may have different characteristics. At least some of the secondary battery cells 101 included in the battery module 100 may be connected in parallel. The configuration of the secondary battery cells 101 will be described later in greater detail.

The battery module 100 also has a current sensor 102 connected in series with the plurality of secondary battery cells 101. The current sensor 102 is connected in series with the plurality of secondary battery cells 101, detects the current flowing through the secondary battery cells 101, and supplies the current value to the BMS 400.

The battery module 100 also includes a voltage sensor 103 and a temperature sensor 104 provided for each of the plurality of secondary battery cells 101. Each of these voltage sensors 103 is connected in parallel to a secondary battery cell 101. Each of the voltage sensors 103 detects the voltage (inter-terminal voltage) between the positive electrode terminal and the negative electrode terminal of a secondary battery cell 101 and supplies the voltage value to the BMS 400. Each of the temperature sensors 104 is also thermally coupled to one of the plurality of secondary battery cells 101, detects the temperature of the secondary battery cell 101, and supplies the temperature value to the BMS 400.

There are no particular restrictions on the configuration of the charger 200. For example, a charging connector connectable to a charging plug connected to an external power source may be provided, and may be configured to convert power supplied from the external power source into charging power for the secondary battery cell 101. The secondary battery cells 101 can be, for example, connected to the charger 200 and charged with charging current supplied by the charger 200 under the control of the BMS 400.

There are no particular restrictions on the configuration of the load 300, which may be configured, for example, as a drive device for an electric vehicle (electric car, hybrid car). The secondary battery cells 101 can, for example, be connected to the load 300 to supply current to the load 300 under the control of the BMS 400.

The BMS 400 is a controller including, for example, a memory 401 and a CPU 402, and controls the charging and discharging of the secondary battery cells 101 in the battery module 100.

The memory 401 can be, for example, RAM, ROM, semiconductor memory, a magnetic disk device, or an optical disk device, and is used to store driver programs, operating system programs, application programs, and data used by the CPU 402 to execute processing. Various programs may be installed in the storage unit 22 using any installation program common in the art from a computer-readable portable recording medium such as a CD-ROM or a DVD-ROM.

The CPU 402 includes one or more processors and their peripheral circuits, and controls overall operation of the BMS 400. The CPU 402 executes processing based on programs (operating system programs, driver programs, application programs, etc.) stored in the memory 401.

Configuration of the Secondary Battery Cells 101

Figure 2:
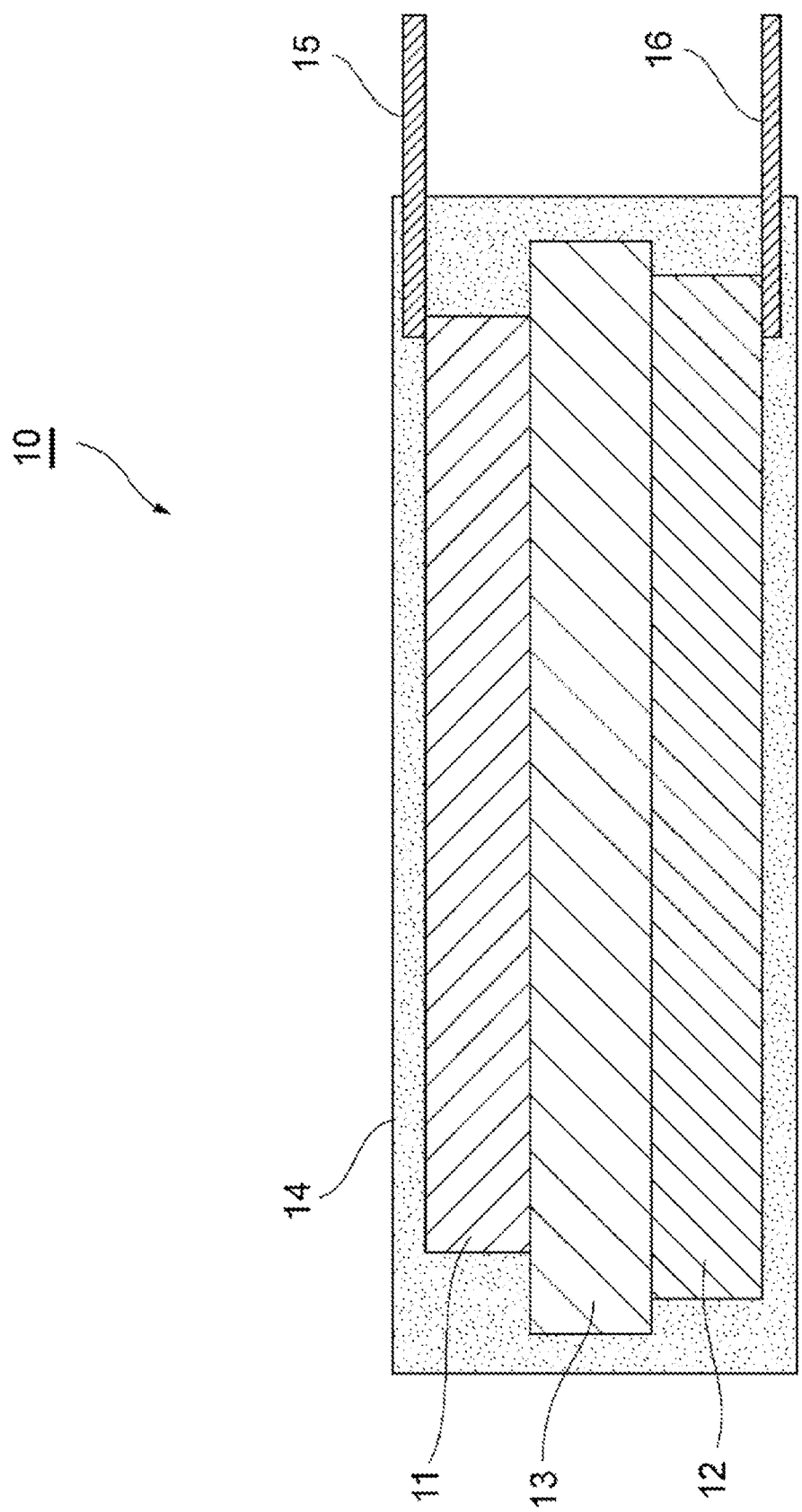
FIG. 2 is a diagram showing an example of a schematic configuration for a secondary battery cell 101.

FIG. 2 is a diagram showing an example of a schematic configuration for a secondary battery cell 101. As shown in FIG. 2, the secondary battery cell 101 is a pouch cell in which a positive electrode 11, a negative electrode 12 free of a negative electrode active material, and a separator 13 disposed between the positive electrode 11 and the negative electrode 12, etc. are sealed inside an outer casing 14. A positive electrode terminal 15 and a negative electrode terminal 16 are connected to the positive electrode 11 and the negative electrode 12, respectively, and extend from the outer casing 14 so that the cell can be connected to an external circuit. The upper and lower surfaces of the secondary battery cell 101 are flat, and the shape can be, but is not limited to, that of a rectangle. Another shape (for example, circular, etc.) can be selected depending on the intended application.

Positive Electrode

Any positive electrode 11 commonly used in a secondary battery can be used here. This can be selected depending on the intended use of the secondary battery and the type of carrier metal being used. From the standpoint of increasing the stability and output voltage of the secondary battery, the positive electrode 11 preferably contains a positive electrode active material.

The positive electrode active material is a material used to retain metal ions in the positive electrode, and this serves as a host material for the metal ions. Examples of positive electrode active materials include, but are not limited to, metal oxides and metal phosphates. Examples of metal oxides include, but are not limited to, cobalt oxide-based compounds, manganese oxide-based compounds, and nickel oxide-based compounds. Examples of metal phosphates include, but are not limited to, iron phosphate-based compounds and cobalt phosphate-based compounds.

When the carrier metal is lithium ions, typical examples of positive electrode active materials include lithium nickel cobalt aluminum oxide (NCA, $LiNiCoAlO_2$), lithium nickel cobalt magnesium oxide ($LiNiCoMnO_2$, referred to as NCM and depending on the difference in element ratio sometimes as NCM622, NCM523, NCM811, etc.), lithium cobaltate (LCO, LiCoO$_2$) and lithium iron phosphate (LFP, LiFePO$_4$). These positive electrode active materials can be used alone or in combinations of two or more. The amount of positive electrode active material included may be, for example, 50% by mass or more and 100% by mass or less relative to the overall mass of the positive electrode 11.

The positive electrode 11 may contain components other than the positive electrode active material. Examples of these components include, but are not limited to, conductive aids, binders, solid polymer electrolytes, and inorganic solid electrolytes commonly used in the art.

The positive electrode 11 may contain a binder. Examples of binders include fluorine-based binders, water-based binders, and imide-based binders. Specific examples of binders include polyvinylidene fluoride (PvDF), styrene-butadiene rubber and carboxymethyl cellulose (SBR-CMC) mixtures, polyacrylic acid (PAA), lithium polyacrylate (Li-PAA), polyimide (PI), polyamideimide (PAI), and aramids. The amount of binder included may be, for example, 0.5% by mass or more and 30% by mass or less relative to the overall mass of the positive electrode 11.

The positive electrode 11 may contain a conductive aid. Examples of conductive aids that can be used include carbon black, acetylene black (AB), carbon nanofibers (VGCF), single-walled carbon nanotubes (SWCNT), and multi-walled carbon nanotubes (MWCNT). The amount of conductive aid included may be, for example, 0.5% by mass or more and 30% by mass or less relative to the overall mass of the positive electrode 11.

The weight per unit area of the positive electrode 11 can be, for example, from to 40 mg/cm$^2$. The thickness of the positive electrode active material 12 can be, for example, from 30 to 150 μm. The density of the positive electrode 11 can be, for example, from 2.5 to 4.5 g/ml. The areal capacity of the positive electrode 11 can be, for example, from 1.0 to 10.0 mAh/cm$^2$.

The area of the positive electrode 11 is preferably 10 cm$^2$ or more and 300 cm$^2$ or less, more preferably 20 cm$^2$ or more and 250 cm$^2$ or less, and even more preferably 50 cm$^2$ or more and 200 cm$^2$ or less.

The thickness (length in the vertical direction) of the positive electrode 11 is preferably 20 μm or more and 150 μm or less, more preferably 40 μm or more and 120 μm or less, and even more preferably 50 μm or more and 100 μm or less.

Negative Electrode

The negative electrode 12 is free of a negative electrode active material. It can be difficult to increase the energy density of a battery that has a negative electrode including a negative electrode active material because of the presence of the negative electrode active material. However, because a secondary battery cell 101 in the present embodiment has a negative electrode 12 that is free of a negative electrode active material, this problem does not arise. In other words, the secondary battery cell 101 has a high energy density because charging and discharging are performed by depositing metal on the surface of the negative electrode 12 and dissolving the deposited metal.

Here, "negative electrode active material" refers to the material retaining the metal ("carrier metal" below) corresponding to the metal ions serving as the charge carrier in the battery on the negative electrode 12, and may also be referred to as the carrier metal host material. Examples of retaining mechanisms include, but are not limited to, intercalation, alloying, and occlusion of metallic clusters. The negative electrode active material is typically used to retain lithium metal or lithium ions in the negative electrode 12.

Examples of negative electrode active materials include, but are not limited to, carbon-based substances, metal oxides, metals, and alloys. Carbon-based substances include, but are not limited to, graphene, graphite, hard carbon, mesoporous carbon, carbon nanotubes, and carbon nanohorns. Examples of metal oxides include, but are not limited to, titanium oxide-based compounds, tin oxide-based compounds, and cobalt oxide-based compounds. There are no particular restrictions on the metal or alloy as long as it can be alloyed with the carrier metal. Examples include silicon, germanium, tin, lead, aluminum, gallium, and alloys containing these.

There are no particular restrictions on the negative electrode 12 as long as it does not contain a negative electrode active material and can be used as a current collector. Examples include at least one type selected from the group consisting of metals such as Cu, Ni, Ti, Fe and other metals that do not react with Li, alloys of these metals, and stainless steel (SUS). When SUS is used as the negative electrode 12, any well-known type of SUS can be used. The negative electrode materials mentioned above may be used alone or in combinations of two or more. A "metal that does not react with Li" refers to a metal that does not react with lithium ions or lithium metal to form an alloy under the operating conditions of the secondary battery cell 101.

The negative electrode 12 is preferably a lithium-free electrode. Because highly flammable lithium metal does not have to be used in the production process, a secondary battery cell 101 with even better safety and productivity can be realized. From this standpoint and from the standpoint of improving the stability of the negative electrode 12, the negative electrode 12 is preferably at least one type selected from the group consisting of Cu, Ni, alloys of these metals, and stainless steel (SUS). From the same standpoints, the negative electrode 12 is more preferably made of Cu, Ni, or alloys these metals, and even more preferably of Cu or Ni.

A "negative electrode free of a negative electrode active material" is also referred to as a "zero anode" or "anode free," and means the amount of negative electrode active material in the negative electrode is 10% by mass or less relative to the overall mass of the negative electrode. The amount of negative electrode active material in the negative electrode is preferably 5.0% by mass or less, more preferably 1.0% by mass or less, even more preferably 0.1% by mass or less, and still more preferably 0.0% by mass or less, relative to the overall mass of the negative electrode.

The negative electrode 12 preferably has an adhesive layer formed on the surface to improve adhesion between the deposited carrier metal and the negative electrode. In this aspect of the present invention, when a carrier metal, especially lithium metal, is deposited on the negative electrode 12, adhesion between the negative electrode 12 and the deposited metal can be improved. As a result, delamination of the deposited metal from the negative electrode 12 can be suppressed, so that the cycle characteristics of the secondary battery cell 101 are improved.

Examples of adhesive layers include metals other than that in the negative electrode, alloys of these metals, and carbonaceous materials. Examples of adhesive layers include, but are not limited to, Au, Ag, Pt, Sb, Pb, In, Sn, Zn, Bi, Al, Ni, Cu, graphene, graphite, hard carbon, mesoporous carbon, carbon nanotubes, and carbon nanohorns. There are no particular restrictions on the thickness of the adhesive layer, but it is preferably 1 nm or more and 300 nm or less, and more preferably 50 nm or more and 150 nm or less.

Using the adhesive layer in this aspect of the present invention results in even better adhesiveness between the negative electrode 12 and the deposited metal. When the adhesive layer corresponds to the negative electrode active material described above, the adhesive layer is 10% by mass or less, preferably 5.0% by mass or less, more preferably 1.0% by mass or less, and still more preferably 0.1% by mass or less relative to the negative electrode.

The area of the negative electrode 12 is preferably greater than that of the positive electrode 11. For example, all four sides can be slightly larger than those of the positive electrode 11 (for example, by about 0.5 to 1.0 mm).

The thickness (length in the vertical direction) of the negative electrode 12 is preferably 20 µm or less, more preferably 10 µm or less, and even more preferably 1 µm or less.

Separator

The separator 13 is the component that separates the positive electrode 11 and the negative electrode 12 to prevent short circuiting, while maintaining conductivity of the metal ions serving as the charge carrier between the positive electrode 11 and the negative electrode 12. When an electrolytic solution is used, the separator 13 also plays a role in retaining the electrolytic solution.

The separator 13 preferably has a separator base material and a separator coating layer coating the surface of the separator base material. There are no particular restrictions on the separator base material as long as it can play this role, and can be, for example, a porous material such as porous polyethylene (PE), polypropylene (PP), or a laminated structure thereof. The area of the separator 13 is preferably larger than the area of the positive electrode 11 and the negative electrode 12, and the thickness is preferably from 5 to 20 µm, for example.

In the present embodiment, the separator coating layer can be applied to one or both sides of the separator base material. The separator coating layer firmly bonds the separator base material to the adjacent layers above and below the base material, while maintaining ionic conductivity and without reacting with the metal ions serving as the charge carriers. There are no restrictions on the separator coating layer as long as it has these characteristics. For example, it may consist of a binder such as polyvinylidene fluoride (PvDF), styrene-butadiene rubber and carboxymethyl cellulose (SBR-CMC) mixtures, polyacrylic acid (PAA), lithium polyacrylate (Li-PAA), polyimide (PI), polyamideimide (PAI), and aramids. The separator coating layer may contain inorganic particles such as silica, alumina, titania, zirconia, magnesium oxide, or magnesium hydroxide particles.

Electrolytic Solution

The secondary battery cell 101 may contain an electrolytic solution. The separator 13 is immersed in the electrolytic solution. The electrolytic solution is an ionically conductive solution prepared by dissolving an electrolyte in a solvent that acts as a conductive path for lithium ions. When an electrolytic solution is used, the internal resistance of the secondary battery cell 101 can be lowered and the energy density and cycle characteristics improved.

A lithium salt is preferably used as the electrolyte. Examples of lithium salts include, but are not limited to, $LiPF_6$, $LiBF_4$, lithium bis(trifluoromethanesulfonyl)imide (LiTFSI), lithium bis(fluorosulfonyl)imide (LiFSI), $LiClO_4$, lithium bisoxalate borate (LiBOB), and lithium bis(pentafluoroethanesulfonyl)imide (LiBETI). The lithium salt is preferably LiFSI from the standpoint of improving the cycle characteristics of the power supply device 1 even more. These lithium salts may be used alone or in combinations of two or more.

Examples of solvents include, but are not limited to, ethylene carbonate (EC), propylene carbonate (PC), dimethyl carbonate (DMC), 1,2-dimethoxyethane (DME), diethyl carbonate (DEC), γ-butyrolactone (GBL), 1,3-dioxolane (DOL), and fluoroethylene carbonate (FEC).

Outer Casing

The outer casing 14 houses and seals the positive electrode 11, the negative electrode 12, the separator 13, and the electrolytic solution in the secondary battery cell 101, and can be made of, for example, a laminate film.

Positive Electrode Terminal and Negative Electrode Terminal

One end of the positive electrode terminal 15 is connected to the upper surface of the positive electrode 11 (the surface opposite the one facing the separator 13) and extends from the outer casing 14, and the other end is connected to an external circuit (not shown). One end of the negative electrode terminal 16 is connected to the lower surface of the negative electrode 12 (the surface opposite the one facing the separator 13) and extends from the outer casing 14, and the other end is connected to an external circuit (not shown). There are no particular restrictions on the materials used in the positive electrode terminal 15 and the negative electrode terminal 16 as long as they are conductive. Examples include Al and Ni.

Functional Configuration of BMS 400

Figure 3:
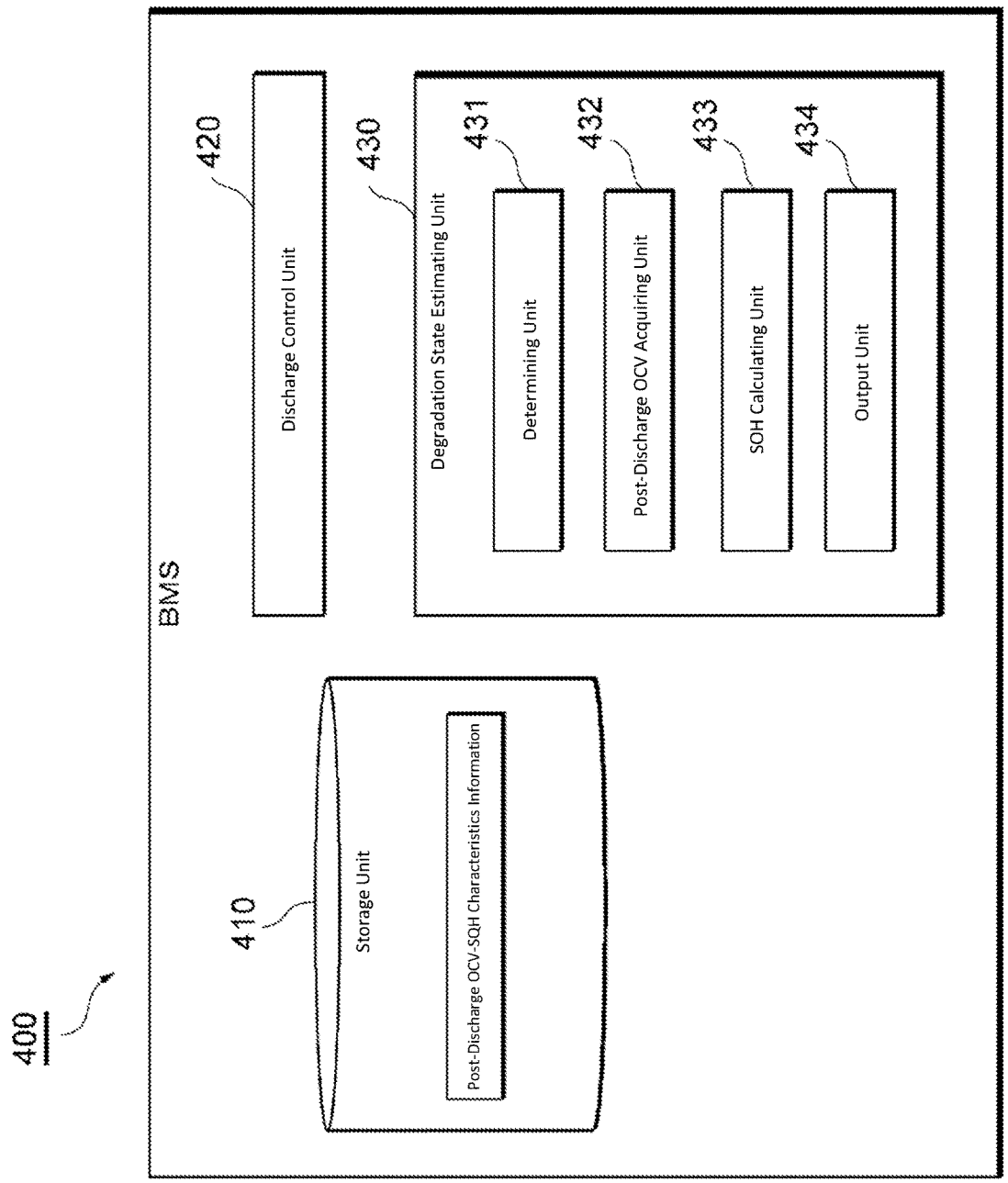
FIG. 3 is a block diagram showing an example of a functional configuration for the BMS 400.

FIG. 3 is a block diagram showing an example of a functional configuration for the BMS 400. The BMS 400 has, for example, a storage unit 410, a discharge control unit 420, and a state-of-deterioration estimating unit 430.

The storage unit 410 is configured using the memory 401 described above and, for example, stores post-discharge OCV-SOH characteristic information indicating changes in SOH relative to changes in post-discharge OCV in secondary battery cells 101, which are measured in advance by testing.

Here, "open circuit voltage (OCV)" refers to the equilibrium voltage when an external power supply is connected between the electrodes of a battery, the current is set to 0 A, and the battery has been allowed to relax for a long period of time within the self-discharge time range. OCV is also referred to as "open circuit voltage." "Post-discharge OCV" refers to the OCV once a predetermined amount of time has elapsed after predetermined discharge control. "Predetermined discharge control" may be defined according to such factors as the discharge time, the remaining capacity at the start of discharge, the remaining capacity at the end of discharge, the terminal voltage of the positive electrode and/or negative electrode at the start of discharge, and the terminal voltage of the positive electrode and/or negative electrode at the end of discharge. The "predetermined amount of time" may be, for example, the time required for the OCV to stabilize.

Also, "state of health (SOH)" is an example of a deterioration index that indicates the extent of deterioration in a battery, and is the ratio (%) of the full charge capacity of the battery relative to the full charge capacity when the battery has not experienced any deterioration (new and unused). SOH is also known as the "capacity retention rate."

Figure 4:
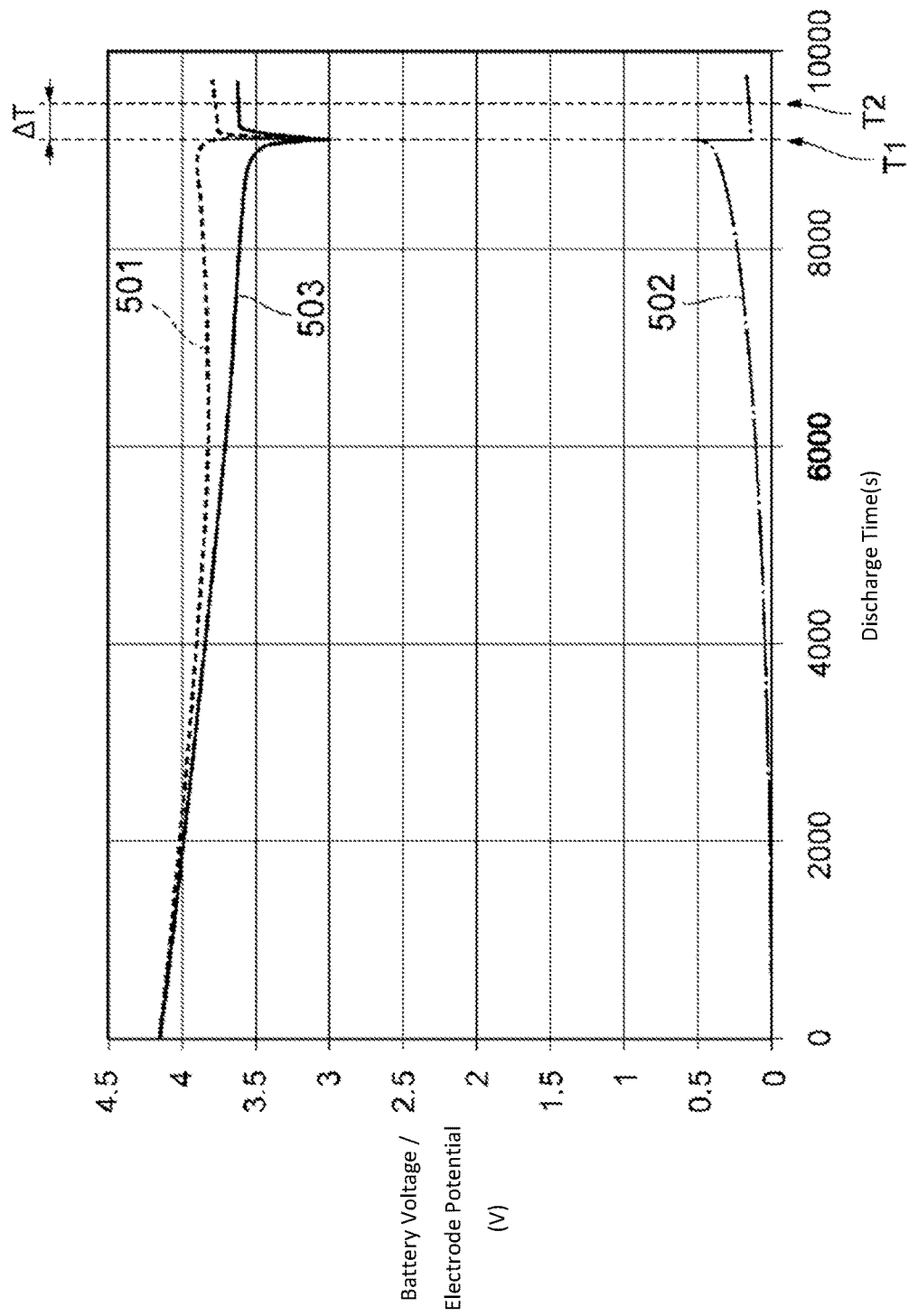
FIG. 4 is a graph showing the results from measuring the post-discharge OCV of the secondary battery cell 101.

Measurement of the post-discharge OCV will now be described with reference to FIG. 4. FIG. 4 is a graph showing the results from measuring the post-discharge OCV of a secondary battery cell 101. In FIG. 4, the horizontal axis indicates time (s), and the vertical axis indicates the battery voltage or electrode potential (V). Also, 501 indicates the potential of the positive electrode terminal 15, 502 indicates the potential of the negative electrode terminal 16, and 503 indicates the potential difference (battery voltage) between the positive electrode terminal 15 and the negative electrode terminal 16.

The potential of the positive electrode terminal 15 before the start of discharge is approximately 4.1 (V). Meanwhile, the potential of the negative electrode terminal 16 at the start of discharge is approximately 0.0 (V). This primarily reflects the potential of the lithium metal covering the negative electrode 12. The discharge is started at time 0 (s). As the discharge progresses, the lithium metal covering the negative electrode 12 gradually moves to the positive electrode 11. The potential of the positive electrode terminal 15 gradually decreases as the discharge progresses. The potential of the negative electrode terminal 16 gradually increases as the discharge progresses.

When the discharge has progressed to a certain extent, the lithium metal can no longer cover the entire surface of the negative electrode 12 and the internal resistance increases sharply. As a result, the potential of the positive electrode terminal drops sharply, and the potential of the negative electrode terminal 16 rises sharply. Then, at time T1, when the potential of the positive electrode terminal 15 reaches a predetermined voltage of about 3 V, the discharge stops based on the discharge plan. When the discharge stops, the potential drop caused by internal resistance disappears, and the potential of the positive electrode terminal 15 increases while the potential of the negative electrode terminal 16 decreases.

Once a predetermined amount of time ΔT has passed after the discharge is stopped, both the potential of the positive electrode terminal 15 and the potential of the negative electrode terminal 16 become stabilized. The potential difference between the positive electrode terminal 15 and the negative electrode terminal 16 at this time is the post-discharge OCV. The length of the predetermined amount of time ΔT may be, for example, the period required for the internal state of the secondary battery cell 101 to reach an equilibrium state and for the OCV to stabilize, and may be set based, for example, on the structure of the secondary battery cell 101.

In the example shown in FIG. 4, the post-discharge OCV was measured after about 9,000 (s) of discharge. However, there are no particular restrictions on the discharge time for measuring the post-discharge OCV, which may be shorter or longer than the example shown in FIG. 4 (about 9,000 (s)).

Figure 5A:
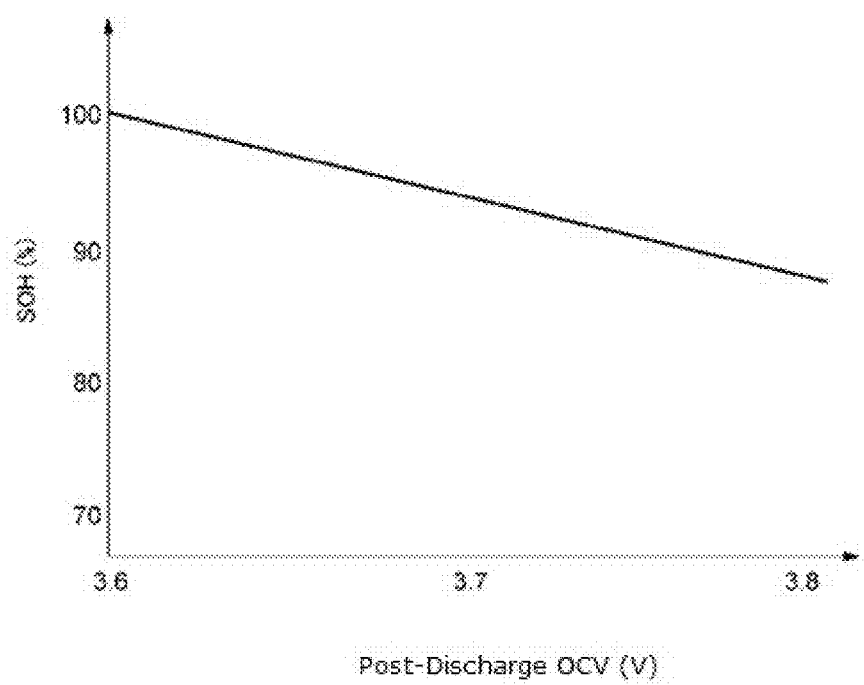
FIG. 5A is a graph showing post-discharge OCV-SOH characteristic information for the secondary battery cell 101 in the present embodiment.
Figure 5B:
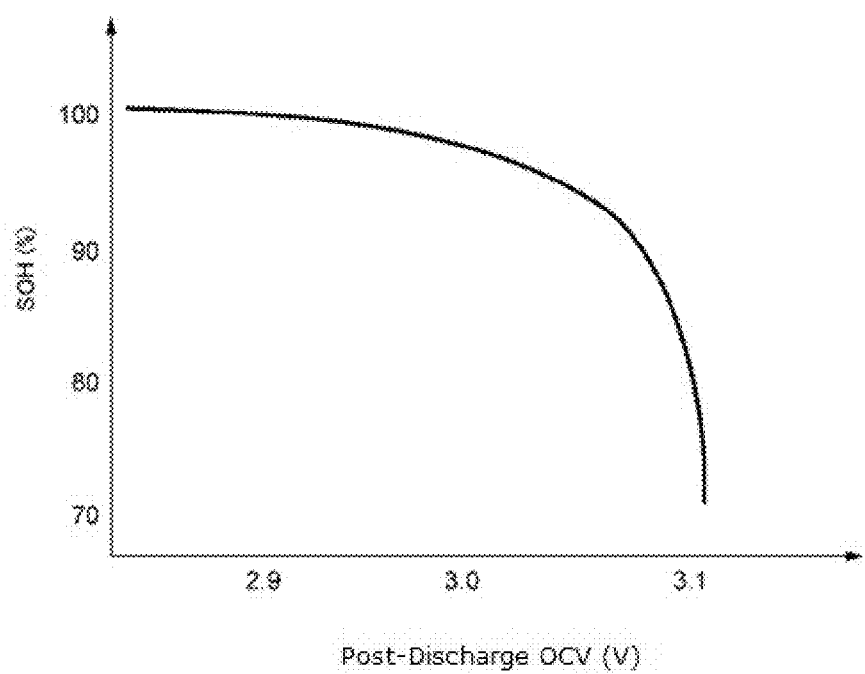
FIG. 5B is a graph showing post-discharge OCV-SOH characteristic information for the lithium-ion secondary battery in a comparative example.
Figure 5C:
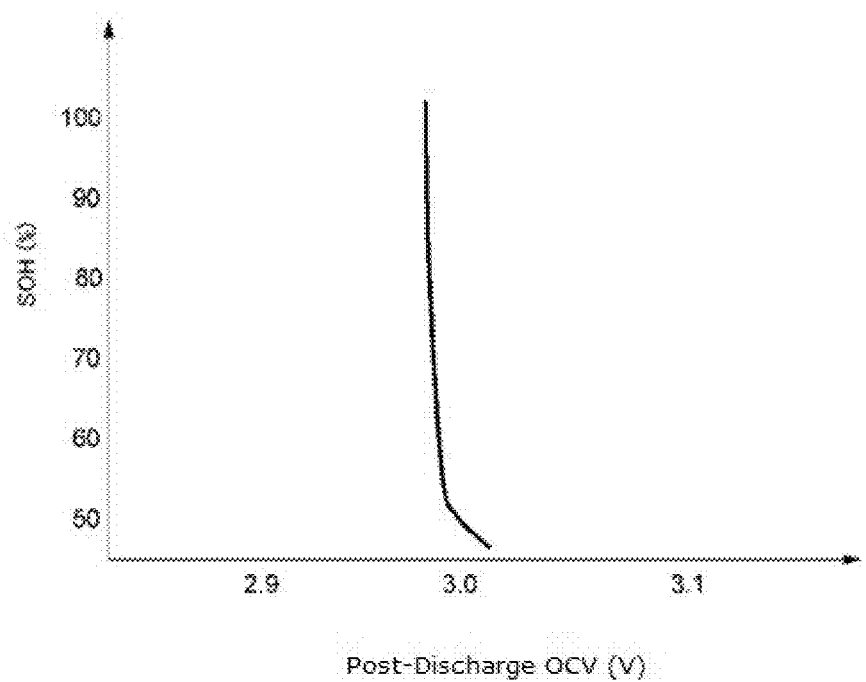
FIG. 5C is a graph showing post-discharge OCV-SOH characteristic information for the lithium metal secondary battery in a comparative example.

The relationship between the post-discharge OCV and SOH will now be described with reference to FIG. 5A to FIG. 5C. FIG. 5A is a graph showing post-discharge OCV-SOH characteristic information for the secondary battery cell 101 in the present embodiment. The post-discharge OCV-SOH characteristic information shown in this figure is the post-discharge OCV-SOH characteristic information stored in storage unit 410 described above. FIG. 5B is a graph showing post-discharge OCV-SOH characteristic information for the lithium-ion secondary battery in a comparative example. FIG. 5C is a graph showing post-discharge OCV-SOH characteristic information for the lithium metal secondary battery in a comparative example.

As shown in FIG. 5B, in the case of a lithium ion secondary battery, the change in SOH relative to the change in post-discharge OCV is relatively small in the range where the post-discharge OCV is relatively small. Meanwhile, the change in SOH relative to the change in post-discharge OCV is relatively large in the range where the post-discharge OCV is relatively small. Also, as shown in FIG. 5C, in the case of a lithium metal secondary battery, the change in post-discharge OCV relative to the change in SOH is extremely small. When the SOH is fairly low (the range of about 50% or less in the figure), the post-discharge OCV increases only slightly as the SOH decreases. Thus, in lithium ion secondary batteries and lithium metal secondary batteries, linearity is not observed in the relationship between the post-discharge OCV and the SOH.

However, the present inventors discovered that when the negative electrode 12 does not contain a negative electrode active material as in the secondary battery cell 101 in the present embodiment, the post-discharge OCV and SOH exhibit linearity as shown in FIG. 5A. In other words, they observed a relatively strong negative correlation between post-discharge OCV and SOH and discovered that the rate of decrease in SOH as the post-discharge OCV increases is nearly the same over a relatively wide post-discharge OCV range. Stated differently, it can be said that the post-discharge OCV of the secondary battery cell 101 indicates the state of the lithium metal on the negative electrode 12 more directly. In particular, the post-discharge OCV-SOH characteristic information may include an equation that approximates SOH as a linear function of post-discharge OCV. Thus, because linearity is observed between the post-discharge OCV and SOH of the secondary battery cell 101 in the present embodiment, the SOH and service life of the secondary battery cell 101 can be predicted directly from a measurement of the post-discharge OCV without having to perform any other prediction calculations.

Returning to FIG. 3, the discharge control unit 420 controls the discharge of each secondary battery cell 101 in the battery module 100 based on a predetermined discharge plan. The discharge plan may be stored in the storage unit 410. The discharge plan may be set according to such factors as the discharge time, the remaining capacity at the start of discharge, the remaining capacity at the end of discharge, the terminal voltage of the positive electrode and/or negative electrode at the start of discharge, and the terminal voltage of the positive electrode and/or negative electrode at the end of discharge.

In the example described above, the post-discharge OCV-SOH characteristic information was stored in storage unit 410 in the form of a graph. However, it may also be stored in the form, for example, of a table in which post-discharge OCV and SOH values are associated, or a function that defines the relationship between the post-discharge OCV and SOH. The storage unit 410 may also store several sets of post-discharge OCV-SOH characteristic information based on the usage environment (for example, the ambient temperature) of the secondary battery cells 101.

The state-of-deterioration estimating unit 430 estimates the state of deterioration of a secondary battery cell 101. The state-of-deterioration estimating unit 430 has, for example, a determining unit 431, a post-discharge OCV acquiring unit 432, an SOH calculating unit 433, and an output unit 434.

The determining unit 431 executes various types of determination processing. The determining unit 431, for example, determines whether or not a predetermined amount of time has elapsed from stoppage of discharge control of the secondary battery cell 101 until the post-discharge OCV can be measured. The determining unit 431 may also determine the usage environment of the secondary battery cell 101 based on values detected from, for example, a current sensor 102, a voltage sensor 103, and a temperature sensor 104.

The post-discharge OCV acquiring unit 432 acquires the voltage value supplied from the voltage sensor 103 to serve as the post-discharge OCV once a predetermined amount of time has elapsed since the discharge control was stopped. Although there are no particular restrictions on the length of the "predetermined amount of time," it is preferably about 1 minute or longer. Also, the length of the "predetermined amount time" may be set according to the type of load supplied by the power supply device 1, and may be, for example, the time that an automobile has made an idling stop. In this example, the post-discharge OCV can be measured while the automobile is waiting for a signal light to turn green. The length of the "predetermined amount of time" is more preferably about 10 minutes after the entire capacity of the power supply device 1 has been discharged to improve the accuracy of the state-of-deterioration estimate.

The SOH calculating unit 433 references the post-discharge OCV-SOH characteristic information stored in the storage unit 410 and retrieves the SOH corresponding to the acquired post-discharge OCV to calculate the SOH. The SOH calculating unit 433 may select post-discharge OCV-SOH characteristic information based on the usage environment of the secondary battery cell 101 as determined by the determining unit 431 from among the sets of post-discharge OCV-SOH characteristic information stored in the storage unit 410, and then use the selected post-discharge OCV-SOH characteristic information to calculate the SOH.

The output unit 434 outputs various types of information including the calculated SOH. For example, the output unit 434 may send information such as the calculated SOH to an information processing device or display it on a display unit.

Post-Discharge OCV-SOH Characteristics Under Various Conditions

Figure 6:
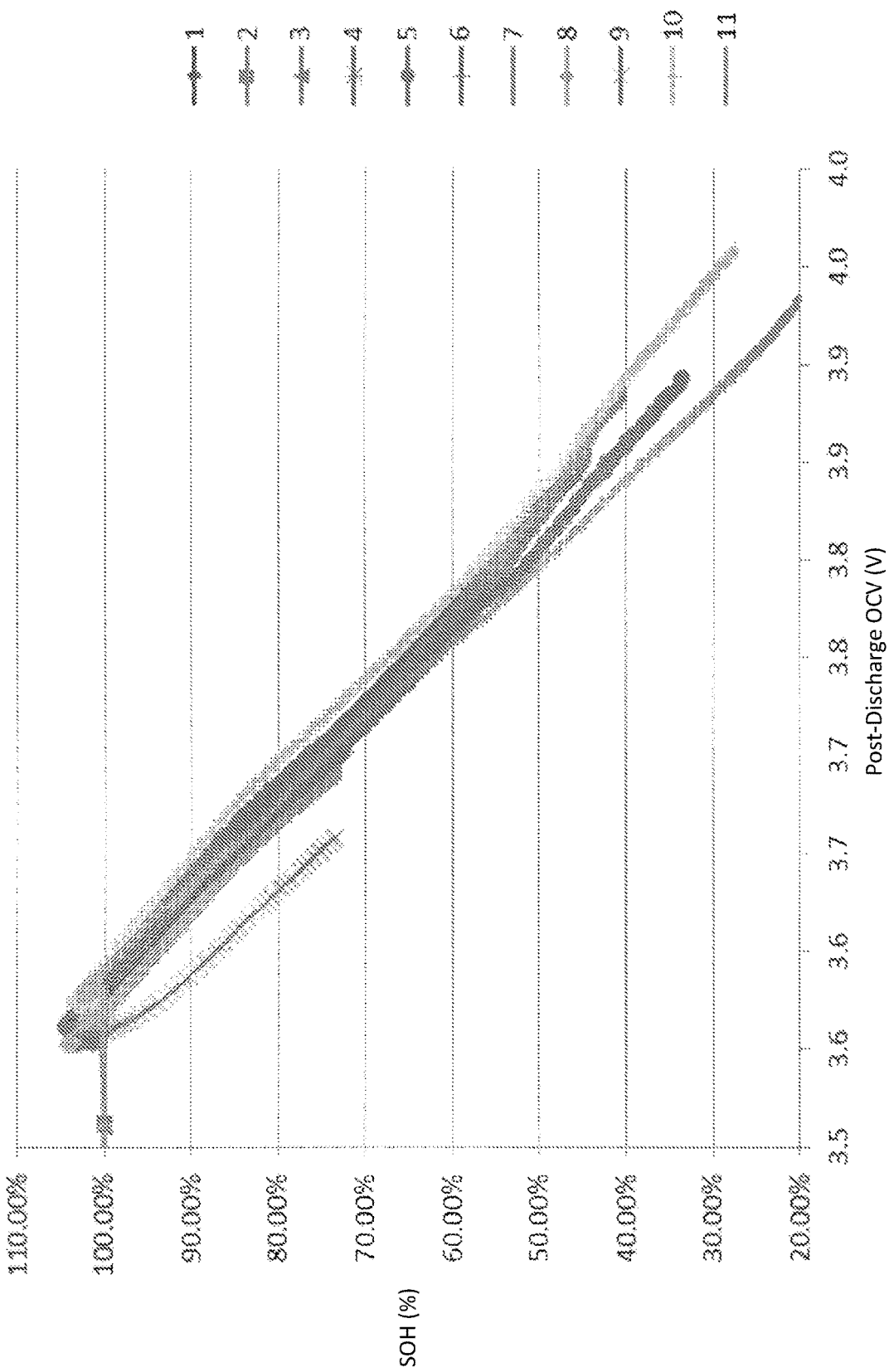
FIG. 6 is a diagram showing the post-discharge OCV-SOH characteristic information from secondary batteries in various examples of the present invention.

Examples 1 to 11 of the present embodiment will now be described. FIG. 6 is a diagram showing the post-discharge OCV-SOH characteristic information from the secondary batteries in Examples 1 to 11. The conditions for each example are shown in Table 1 below.

TABLE 1

| | Battery Conditions | | Operating Conditions | |
|---|---|---|---|---|
| | Positive Electrode Weight (mg/cm$^2$) | Separator | Charging Rate (C)/ Discharge Rate (C) | Upper Limit Voltage (V) |
| Ex. 1 | 10 | A | 0.1/0.3 | 4.2 |
| Ex. 2 | 10 | A | 0.2/0.3 | 4.2 |
| Ex. 3 | 10 | A | 0.1/0.3 | 4.3 |
| Ex. 4 | 15 | A | 0.1/0.3 | 4.2 |
| Ex. 5 | 15 | A | 0.2/0.3 | 4.2 |
| Ex. 6 | 15 | A | 0.1/0.3 | 4.3 |
| Ex. 7 | 20 | A | 0.1/0.3 | 4.2 |
| Ex. 8 | 20 | A | 0.2/0.3 | 4.2 |
| Ex. 9 | 20 | B | 0.1/0.3 | 4.3 |
| Ex. 10 | 25 | A | 0.1/0.3 | 4.2 |
| Ex. 11 | 25 | B | 0.1/0.3 | 4.2 |

Each embodiment is defined by battery conditions and operating conditions. Battery conditions include the weight of the positive electrode (mg/cm$^2$) and the configuration of the separator. Operating conditions include the charge rate (C), the discharge rate (C), and the upper limit voltage (V). The upper limit voltage is the voltage at which charging is stopped. While not shown in Table 1, the lower limit voltage is the voltage at which discharge is stopped. In Table 1, separator "A" is a polyethylene-based separator coated with PVDF ( ), and separator "B" is a polyethylene-based separator coated with an aramid.

In the post-discharge OCV-SOH characteristic information for Examples 1 to 11, linearity is observed between the post-discharge OCV and SOH at the conditions for each example as shown in FIG. 6. Specifically, in all of the examples, the graph changes so as to track downward at a substantially constant ratio (slope, incline) around (post-discharge OCV, SOH)=(3.6 V, 100%). There is an especially large overlap between the examples. Therefore, in all of the examples, a relatively strong negative correlation is observed between the post-discharge OCV and SOH, and the rate of decrease in SOH as the post-discharge OCV increases can be said to be approximately the same over a relatively wide post-discharge OCV range.

State-of-Deterioration Estimating Process

Figure 7:
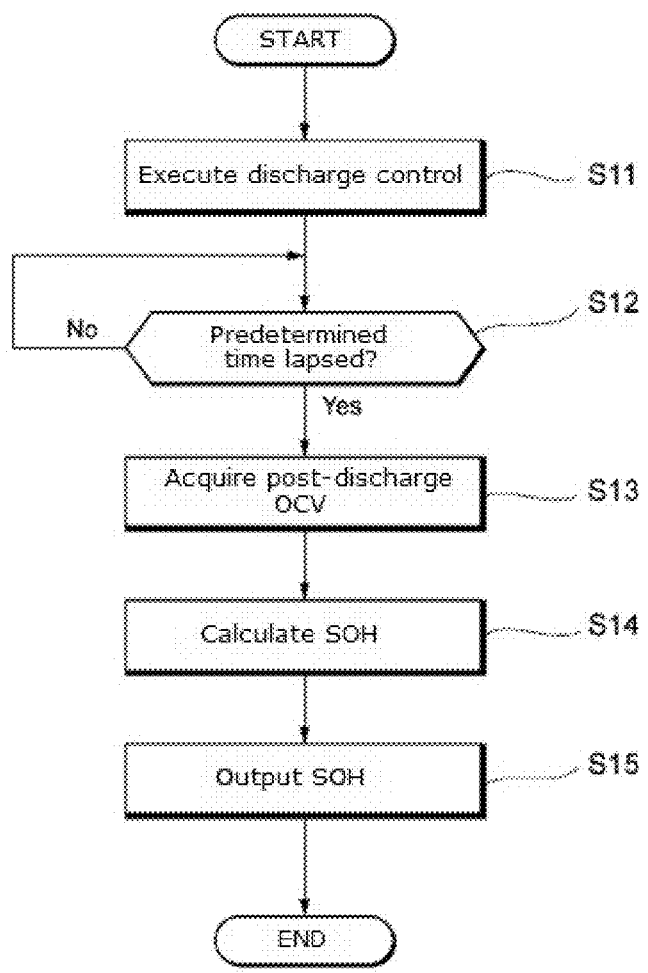
FIG. 7 is a flowchart showing an example of the operational flow of the state-of-deterioration estimation processing performed by the BMS 400.

FIG. 7 is a flowchart showing an example of the operational flow of the state-of-deterioration estimation processing performed by the BMS 400. During the operation flow, the determining unit 431 may intermittently determine the usage environment of the secondary battery cell 101 based on values detected by, for example, a current sensor 102, a voltage sensor 103, and a temperature sensor 104.

(S11) First, the discharge control unit 420 performs discharge control according to a predetermined discharge plan. The discharge plan may be set according to such factors as the discharge time, the remaining capacity at the start of discharge, the remaining capacity at the end of discharge, the terminal voltage of the positive electrode and/or negative electrode at the start of discharge, and the terminal voltage of the positive electrode and/or negative electrode at the end of discharge.

(S12) Next, the determining unit 431 determines whether or not a predetermined amount of time has passed since the discharge was stopped in step S11. The determination processing is performed until it has been determined that a predetermined amount of time has passed since the discharge is stopped in step S11.

(S13) When it has been determined that the predetermined amount of time has passed since the discharge stopped, the post-discharge OCV acquiring unit 432 acquires the voltage value supplied by the voltage sensor 103 to serve as the post-discharge OCV.

(S14) Next, the SOH calculating unit 433 references the post-discharge OCV-SOH characteristic information stored in the storage unit 410, and retrieves the SOH corresponding to the post-discharge OCV acquired in step S13 to calculate the SOH. At this time, the determining unit 431 may select post-discharge OCV-SOH characteristic information based on the usage environment of the secondary battery cell 101 as determined by the determining unit 431 from among the sets of post-discharge OCV-SOH characteristic information stored in the storage unit 410, and then use the selected post-discharge OCV-SOH characteristic information to calculate the SOH.

(S15) Next, the output unit 434 outputs the calculated SOH. For example, the output unit 434 may send information such as the calculated SOH to an information processing device or display it on a display unit. The state-of-deterioration estimating process is then complete.

MODIFIED EXAMPLES

The embodiment described above is provided merely to explain the present invention and is not intended to limit the present invention to the embodiment. Various modifications are possible without departing from the scope and spirit of the present invention.

Figure 8:
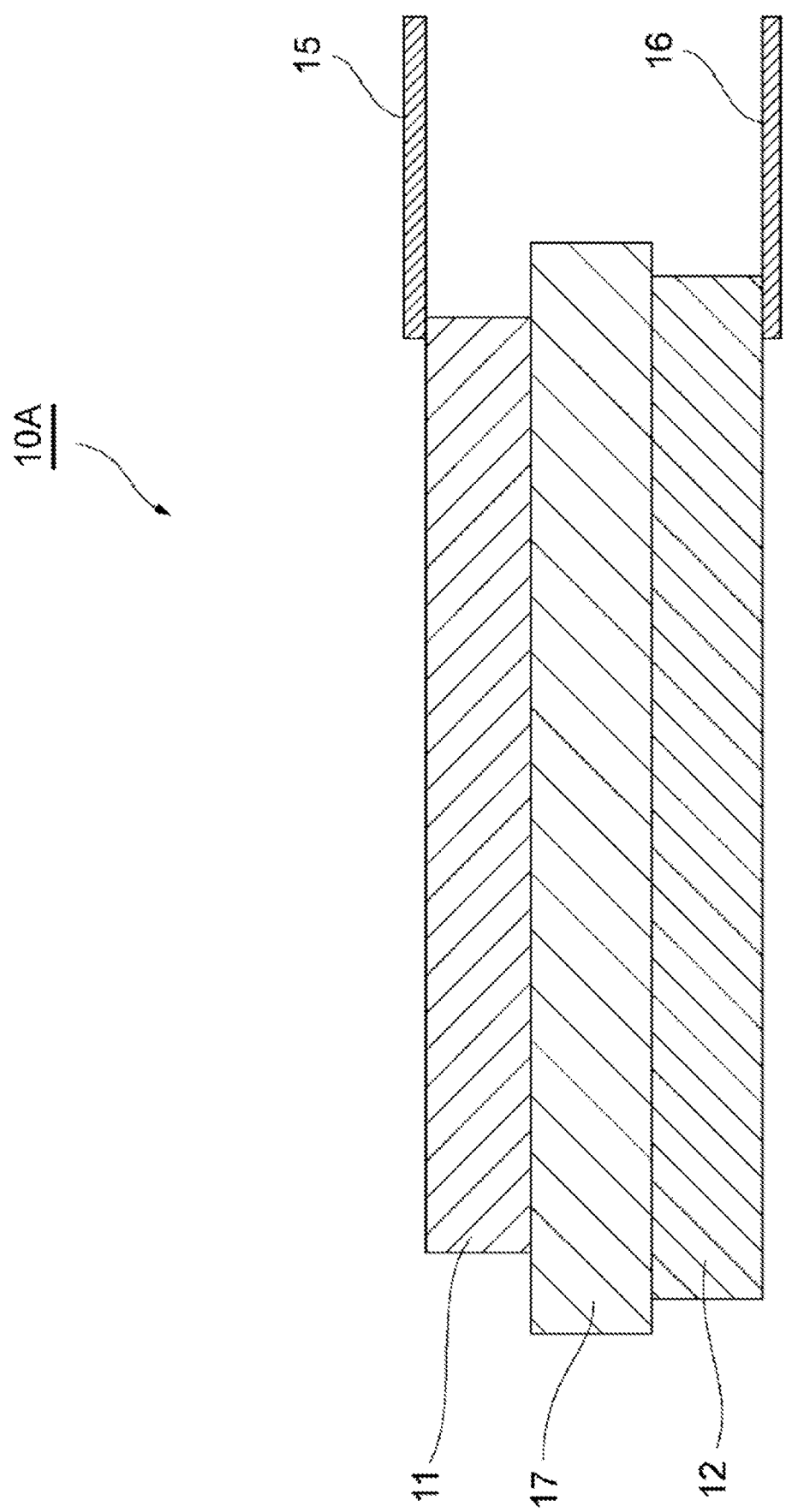
FIG. 8 is a diagram showing another example of a schematic configuration for a secondary battery cell 101.

For example, the secondary battery cell may have a solid electrolyte layer instead of a separator. FIG. 8 is a diagram showing another example of a schematic configuration for a secondary battery cell 101A. The secondary battery cell 101A shown in FIG. 8 is a solid-state battery in which a solid electrolyte layer 17 is formed between the positive electrode 11 and the negative electrode 13. This secondary battery cell 101A differs from the secondary battery cell 101 in the embodiment described above (FIG. 2) in that the separator 13 has been changed to a solid electrolyte layer 17 and an outer casing is not required.

In general, in a battery containing an electrolytic solution, the physical pressure applied by the electrolytic solution to the surface of the negative electrode tends to vary locally due to fluctuations in the liquid. In contrast, because the secondary battery cell 101A includes a solid electrolyte layer 17, the pressure applied to the surface of the negative electrode 12 is more uniform, and the shape of the carrier metal deposited on the surface of the negative electrode 12 is more uniform. Because the carrier metal deposited on the surface of the negative electrode 12 is kept from growing in the form of dendrites, the cycle characteristics of the secondary battery (secondary battery cell 101A) are further improved.

A commonly used material can be selected for the solid electrolyte layer 17 based on the intended application of the secondary battery and the type of carrier metal used. Preferably, the solid electrolyte layer 17 has ionic conductivity and no electron conductivity. This can further reduce the internal resistance in the secondary battery cell 101A and further suppress short-circuiting inside the secondary battery cell 101A. As a result, the secondary battery (secondary battery cell 101A) has a higher energy density and even more excellent cycle characteristics.

There are no particular restrictions on the solid electrolyte layer 17, which may include, for example, resins and salts. Resins include, but are not limited to, resins having an ethylene oxide unit in the main chain and/or a side chain, acrylic resins, vinyl resins, ester resins, nylon resins, polysiloxanes, polyphosphazene, polyvinylidene fluoride, polymethyl methacrylate, polyamides, polyimides, aramids, polylactic acid, polyethylenes, polystyrenes, polyurethanes, polypropylenes, polybutylenes, polyacetals, polysulfones, and polytetrafluoroethylene. These resins can be used alone or in combinations of two or more.

There are no particular restrictions on the salt used in the solid electrolyte layer 17. Examples include salts of Li, Na, K, Ca, and Mg. Examples of lithium salts that can be used include, but are not limited to, LiI, LiCl, LiBr, LiF, $LiBF_4$, $LiPF_6$, $LiAsF_6$, $LiSO_3CF_3$, $LiN(SO_2F)_2$, $LiN(SO_2CF_3)_2$, $LiN(SO_2CF_3CF_3)_2$, $LiB(O_2C_2H_4)_2$, $LiB(O_2C_2H_4)F_2$, $LiB(OCOCF_3)_4$, $LiNO_3$, and $Li_2SO_4$. These lithium salts can be used alone or in combinations of two or more.

Generally, the ratio of resin to lithium salt in the solid electrolyte is determined by the ratio of oxygen atoms in the resin to lithium atoms in the lithium salt ($[Li]/[O]$). In the solid electrolyte layer 17, the ($[Li]/[O]$) ratio is preferably 0.02 or more and 0.20 or less, more preferably 0.03 or more and 0.15 or less, and even more preferably 0.04 or more and 0.12 or less.

The solid electrolyte layer 17 may contain components other than the resins and salts mentioned above. For example, the layer may contain an electrolytic solution similar to the electrolytic solution in the secondary battery cell 101. In this case, the secondary battery cell 101A is preferably sealed inside an outer casing.

The solid electrolyte layer 17 preferably has a certain thickness from the standpoint of reliably separating the positive electrode from the negative electrode. However, from the standpoint of increasing the energy density of the secondary battery (secondary battery cell 101A), the thickness is preferably kept below a certain level. Specifically, the average thickness of the solid electrolyte layer 17 is preferably from 5 μm to 20 μm, more preferably from 7 μm to 18 μm or less, and even more preferably from 10 μm to 15 μm.

In the present specification, "solid electrolyte" includes gel electrolytes. Gel electrolytes include, but are not limited to, those containing polymers, organic solvents, and lithium salts. Polymers that can be used in a gel electrolyte include, but are not limited to, copolymers of polyethylene and/or polyethylene oxide, polyvinylidene fluoride, and copolymers of polyvinylidene fluoride, and hexafluoropropylene.

The secondary battery cell 101 may also have a current collector arranged so as to be in contact with the positive electrode or the negative electrode. Here, a positive electrode terminal and a negative electrode terminal are connected to the current collector. There are no particular restrictions on the current. Examples include current collectors that can be used with negative electrode materials. When the secondary battery cell 101 does not have a current collector, the negative electrode and the positive electrode themselves act as current collectors.

The secondary battery cell 101 may also be formed by laminating a plurality of negative electrodes, separators or solid electrolyte layers, and positive electrodes to improve battery capacity and output voltage. The number of laminated units may be, for example, three or more, and preferably from ten to 30.

Figure 9:
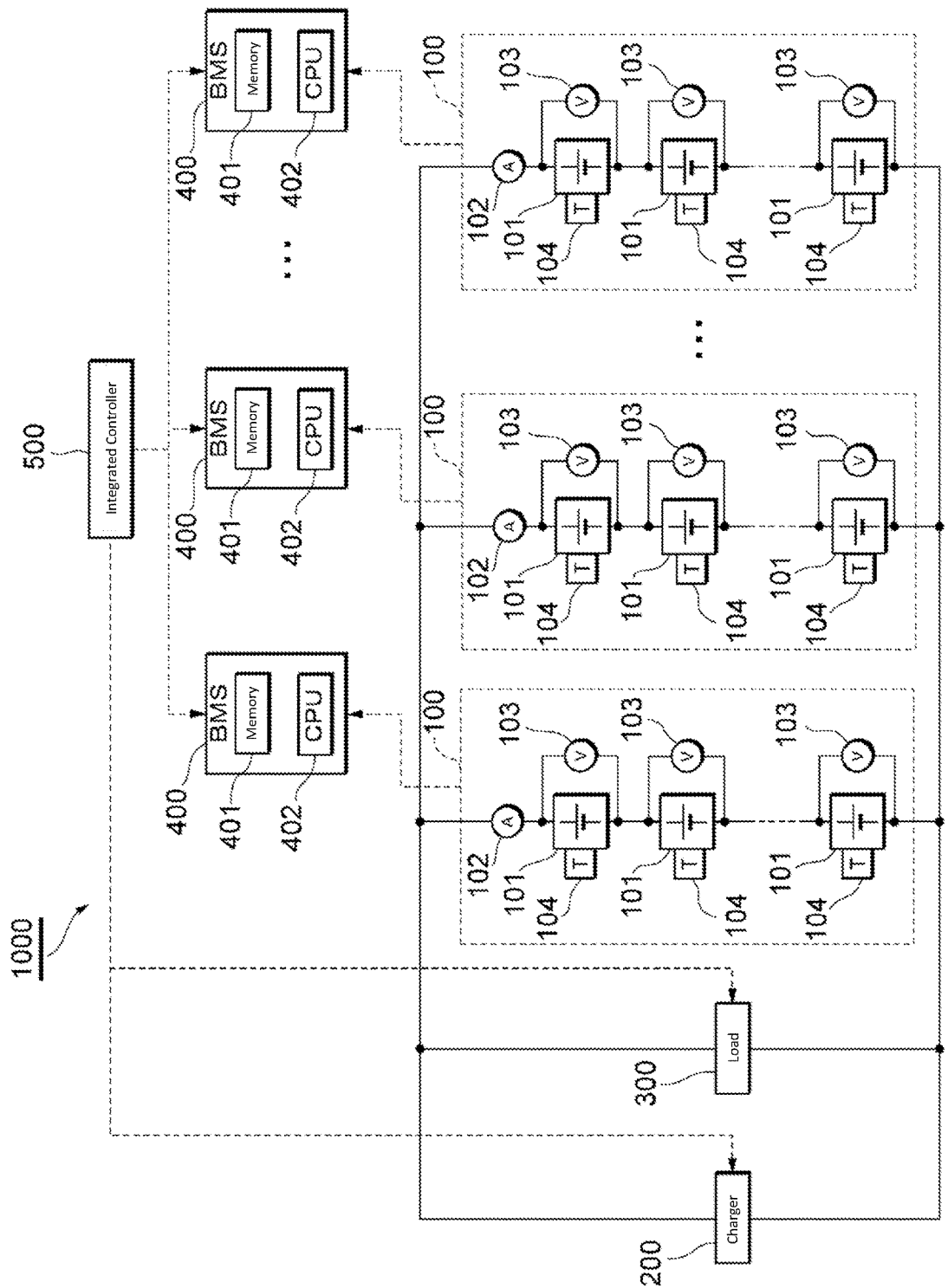
FIG. 9 is a diagram showing an example of a schematic configuration for a battery pack 1000 according to an embodiment of the present invention.

FIG. 9 is a diagram showing an example of a schematic configuration for a battery pack 1000 according to an embodiment of the present invention. The battery pack 1000 is an example of a power supply device 1 application. As shown in FIG. 9, the battery pack 1000 controls the charging and discharging of a plurality of battery modules 100 connected in parallel and the secondary battery cells 101 in each battery module 100. Note that the battery pack 1000 may consist of a plurality of battery modules 100 connected in series.

The battery pack 1000 also includes an integrated controller 500 that manages and controls each BMS 400 in an integrated manner. The integrated controller 500 is, for example, an information processing device including a memory and a CPU. In the battery pack 1000, the integrated controller 500 may control the charger 200 and/or the load 300. Alternatively, the integrated controller 500 in the battery pack 1000 may integrally manage and control each battery pack 100 (and the charging and discharging of each secondary battery cell 101 in the pack) and not each BMS 400.

In the present specification, "high energy density" means the capacity is high relative to the total volume or total mass of the battery. This is preferably 800 Wh/L or more or 350 Wh/kg or more, more preferably 900 Wh/L or more or 400 Wh/kg or more, and even more preferably 1000 Wh/L or more or 450 Wh/kg or more.

In the embodiment described above, SOH is used as an example of a deterioration index. However, the deterioration index is not limited to SOH. In particular, the present embodiment can use a deterioration index other than SOH as long as the index shows linearity with respect to the post-discharge OCV.

The embodiments described above are provided to make the present invention easier to understand, and are not intended to limit interpretation of the present invention. Each element included in the embodiments and their arrangement, materials, conditions, shape, size, etc. are not limited to those depicted herein and can be changed when appropriate. Also, elements in different embodiments can be partially replaced or combined when appropriate.

REFERENCE SIGNS LIST

1: Power supply device,
11: Positive electrode,
12: Negative electrode,
13: Separator,
14: Outer casing,
15: Positive electrode terminal,
16: Negative electrode terminal,
17: Solid electrolyte,
100: Battery module
101: Secondary battery cell,
102: Current sensor,
103: Voltage sensor
200: Charger,
300: Load,
400: Battery management system (BMS)
401: Memory,
402: CPU,
410: Storage unit,
420: Discharge control unit
430: State-of-deterioration estimating unit,
431: Determining unit
432: Post-discharge OCV acquiring unit,
433: SOH calculating unit
434: Output unit,
1000: Battery pack

What is claimed is:

1. A state-of-deterioration estimating device comprising:
an acquiring unit that acquires a post-discharge OCV that is an open circuit voltage (OCV) in the state after a predetermined amount of time or more has elapsed since the discharge was stopped for a secondary battery comprising an electrolytic solution and having a negative electrode free of a negative electrode active material, wherein a carrier metal is deposited on a surface of the negative electrode by charging and the deposited carrier metal is dissolved by discharging;
a calculating unit that calculates the state of deterioration of the secondary battery based on the acquired post-discharge OCV by referencing characteristic information indicating the change in a predetermined deterioration index that indicates the degree of deterioration in the secondary battery relative to the change in the post-discharge OCV of the secondary battery; and
an output unit that outputs the state of deterioration that has been calculated, wherein:
the predetermined deterioration index is a state of health (SOH);
the characteristic information comprises a linear function such that the SOH is determined directly from the post-discharge OCV without having to perform prediction calculations; and
the SOH and the post-discharge OCV have a negative correlation in the linear function.

2. The state-of-deterioration estimating device according to any one of claims 1, wherein the carrier metal in the secondary battery is lithium.

3. A method for estimating a state of deterioration comprising the steps of:
acquiring a post-discharge OCV that is an open circuit voltage (OCV) in the state after a predetermined amount of time or more has elapsed since the discharge was stopped for a secondary battery comprising an electrolytic solution and having a negative electrode free of a negative electrode active material, wherein a carrier metal is deposited on a surface of the negative electrode by charging and the deposited carrier metal is dissolved by discharging;
calculating the state of deterioration of the secondary battery based on the acquired post-discharge OCV by referencing characteristic information indicating the change in a predetermined deterioration index that indicates the degree of deterioration in the secondary battery relative to the change in the post-discharge OCV of the secondary battery; and
outputting the state of deterioration that has been calculated, wherein:
the predetermined deterioration index is a state of health (SOH);
the characteristic information comprises a linear function such that the SOH is determined directly from the post-discharge OCV without having to perform prediction calculations; and
the SOH and the post-discharge OCV have a negative correlation in the linear function.

4. A program causing a computer to function as:
an acquiring unit that acquires a post-discharge OCV that is an open circuit voltage (OCV) in the state after a predetermined amount of time or more has elapsed since the discharge was stopped for a secondary battery comprising an electrolytic solution and having a negative electrode free of a negative electrode active material, wherein a carrier metal is deposited on a surface of the negative electrode by charging and the deposited carrier metal is dissolved by discharging;
a calculating unit that calculates a state of deterioration of the secondary battery based on the acquired post-discharge OCV by referencing characteristic information indicating the change in a predetermined deterioration index that indicates the degree of deterioration in the secondary battery relative to the change in the post-discharge OCV of the secondary battery; and
an output unit that outputs the state of deterioration that has been calculated, wherein:
the predetermined deterioration index is a state of health (SOH);
the characteristic information comprises a linear function such that the SOH is determined directly from the post-discharge OCV without having to perform prediction calculations; and
the SOH and the post-discharge OCV have a negative correlation in the linear function.

* * * * *